United States Patent
Mutikainen et al.

(10) Patent No.: US 8,203,982 B2
(45) Date of Patent: Jun. 19, 2012

(54) ACCESS DOMAIN SELECTION IN A TERMINAL

(75) Inventors: Jari Mutikainen, Lepsama (FI); Mari Melander, Espoo (FI); Matti Saarenpää, Tampere (FI); Martin Öttl, Weilheim (DE); Curt Wong, Sammamish, WA (US)

(73) Assignee: Nokia Siemens Networks Oy, Espoo (FI)

( * ) Notice: Subject to any disclaimer, the term of this patent is extended or adjusted under 35 U.S.C. 154(b) by 941 days.

(21) Appl. No.: 12/213,346

(22) Filed: Jun. 18, 2008

(65) Prior Publication Data

US 2009/0003276 A1    Jan. 1, 2009

Related U.S. Application Data

(60) Provisional application No. 60/929,238, filed on Jun. 19, 2007.

(51) Int. Cl.
*H04B 7/00* (2006.01)

(52) U.S. Cl. ........................................................ 370/310

(58) Field of Classification Search .................. 370/310, 370/312, 328–332, 431, 437, 464, 465; 709/227–229, 249
See application file for complete search history.

(56) References Cited

U.S. PATENT DOCUMENTS

| | | | | |
|---|---|---|---|---|
| 6,920,121 B2 * | 7/2005 | Tan | ............................... | 370/329 |
| 7,792,985 B2 * | 9/2010 | Liu | ............................... | 709/232 |
| 2008/0049648 A1 * | 2/2008 | Liu et al. | ....................... | 370/310 |
| 2008/0089289 A1 * | 4/2008 | Jayaram et al. | ................ | 370/331 |
| 2008/0102815 A1 * | 5/2008 | Sengupta et al. | ............. | 455/424 |
| 2008/0102832 A1 * | 5/2008 | Sengupta et al. | .......... | 455/435.2 |
| 2010/0257273 A1 * | 10/2010 | Mutikainen et al. | .......... | 709/227 |

OTHER PUBLICATIONS

International Search Report, PCT/EP2008/054676 dated Nov. 21, 2008.
3GPP TR23.892; 3rd Generation Partnership Project; Technical Specification Group Services and System Aspects; IP Multimedia System (IMS) Centralized Services (Release 8) V0.5.5; May 2007; pp. 1-72.
3GPP TR23.818; 3rd Generation Partnership Project; Technical Specification Group Services and Architecture; Optimisations and Enhancements for Realtime IMS Communication (Release 7) V0.10.0; Feb. 2007; pp. 1-70.
3GPP TR23.982; 3rd Generation Partnership Project; Technical Specification Group Services and System Aspects; IP Multimedia System (IMS) Centralized Services (Release 8) V0.3.1; Mar. 2007; pp. 1-18.

(Continued)

*Primary Examiner* — Dmitry H Levitan
(74) *Attorney, Agent, or Firm* — Squire Sanders (US) LLP (57) ABSTRACT

The present application discloses a system of at least a network element and at least a terminal. The system constituents are configured to provide assistance by the terminal to the network element in terms of access domain selection for at least one of the media channel and the session control channel of an incoming call to the terminal. In this regard, the terminal acquires information about the capabilities of an access network in which the terminal is camping. Upon receiving, at the terminal, an invitation to participate in a call, the terminal analyzes the acquired information about the capabilities of the access network, and optionally or additionally of the IMS network. The terminal responds to the invitation, based on the result of the analyzing, with an indication that indicates a respective access domain to be used for at least one of the media channel and the session control channel of the incoming call.

16 Claims, 8 Drawing Sheets

OTHER PUBLICATIONS

3GPP TS23.206; 3rd Generation Partnership Project; Technical Specification Group Services and System Aspects; Voice Call Continuity (VCC); Between Circuit Switched (CS); and IP Multimedia Subsystem (IMS); Stage 2 (Release 7) V7.2.0; Mar. 2007; pp. 1-36; XP-002503211.

3GPP TR23.892; 3rd Generation Partnership Project; Technical Specification Group Services and System Aspects; IP Multimedia System (IMS) Centralized Services (Release 8) V1.0.0; Jun. 2007; pp. 1-69; XP-002503210.

* cited by examiner

ACCESS DOMAIN SELECTION IN A TERMINAL

CROSS-REFERENCE TO RELATED APPLICATIONS

The present application claims priority of U.S. provisional application Ser. No. 60/929,238, filed on Jun. 19, 2007 and PCT international application number PCT/EP2008/054676, filed on Apr. 17, 2008. Both of these applications are claimed and the entire contents of these applications are hereby incorporated by reference.

FIELD OF THE INVENTION

The present invention generally relates to access domain selection in a terminal, and in particular to a corresponding method, terminal, network entity, system, and module and/or chipset therefor.

BACKGROUND OF THE INVENTION

Mobile communication has made considerable progress in recent years. Starting from a traditional circuit switched (CS) approach as pursued in the Global System of Mobile Communication (GSM), the technological evolution has made its way towards packet switched (PS) systems such as those operating for example on the basis of the Internet Protocol (IP). An example of such communication system is the Universal Mobile Telecommunication Standard (UMTS), or a system known as IMS system (IP Multimedia System). While in former systems, speech or voice was a main aspect of "media" as payload data to be conveyed via the communication system, nowadays all kind of media are focused on as payload, e.g. speech, music (audio), images (still images i.e. pictures as well as moving images i.e. videos), executable program code, text data, and many other types or combinations of media types. "Media" as used in this document is to be understood as not being limited to a specific type of media but is intended to be used in its broadest possible meaning.

With the emerging development of new systems, those systems coexist in parallel and interoperability is one aspect of the development. In particular in case of users (represented by their terminals, e.g. mobile stations MS in GSM or user equipment UE in UMTS and/or IMS) that move and/or roam throughout the communication networks, they expect seamingless services of high quality to be provided to them, irrespective of the current communication system in which they camp.

In Release 8 of the 3rd Generation partnership project, 3GPP Rel-8, a study has started on how to provide IMS (IP Multimedia Subsystem) service via CS (circuit switched) access. This study is covered within 3GPP under the topic "IMS centralized service control". A corresponding Technical Report TR 23.892 summarizes the results of this study.

IMS service provisioning relies on IP connectivity, which is at least for a VoIP (Voice over IP) data stream not always available, e.g. when roaming in GSM access systems. The above study tries to overcome this limitation by studying how to re-use CS access or how to accomplish access with limited PS capability.

For ICS (IMS Centralized Services) the service control, and as far as possible the service provisioning, shall be in the IMS domain. This leads to the need to have an extra signaling connection between a terminal and the IMS domain, transferred by the CS domain. So, it is envisioned that the session signaling and bearer setup signaling are separated as shown in FIG. 1.

Figure 1:
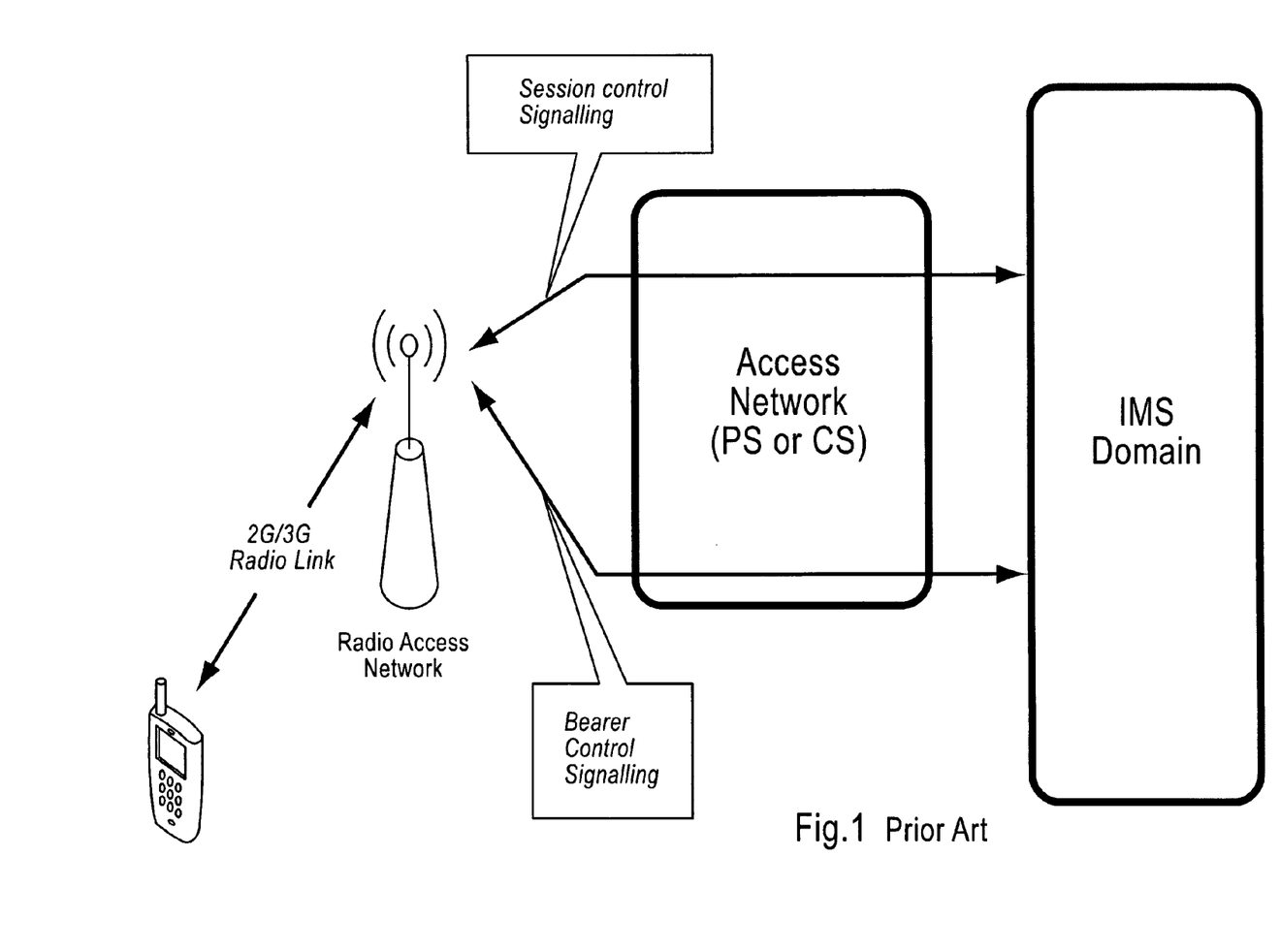

FIG. 1 shows a terminal accessing a radio access network via an illustrated access node thereof, i.e. a Base Station BS or Node_B. Such access is accomplished via either a 2G or 3G radio link. Both 2G and 3G links are assumed to be circuit switched CS and both links are assumed to be packet switched PS capable. From the access node as such, signaling and payload connections extend through the access network towards the IMS domain.

A call from/to a terminal represents a logical association between two endpoints, one of which being the terminal. In a CS domain, the call relies on a bearer connection between the endpoints. In a PS domain, the call relies on a session established between the endpoints. The call comprises signaling and payload (media) delivered, and thus a signaling channel is established as well as a media channel. Each of the channels thus may in principle rely on PS or CS access domain.

Thus, as shown in FIG. 1, a CS based bearer control signaling path extends via the access network to the IMS Domain and also a PS based session control signaling path extends via the access network to the IMS Domain.

Within the IMS domain, so called IMS centralized services (ICS) are provisioned. Entities configured to assist and/or accomplish this are not shown as such in FIG. 1 but are referred to as ICS centralized services control functionality ICCF. A terminal requesting for such services and/or being provisioned with such services is referred to as ICS UE.

It is to be noted that the examples given in conjunction with the present invention are not intended to be limiting in any way. Rather, specific terminology as used in some documents referred to in this document is adopted as an example only to simplify the description of the present invention and to illustrate a particular case to which the present invention may advantageously be applicable. This, however, is not intended to exclude any other field of application for the present invention, as long as the access paths towards a terminal rely on at least two distinct access principles or access domains such as CS and PS.

The above mentioned technical report TR23.892 considers three different network scenarios referred to as scenario A, B and C for centralized IMS service control, which can briefly be described as follows:

Scenario A: The serving access network is an IP-CAN (IP connectivity access network) fully capable of transporting bi-directional speech media or media/content in general. Here both, i.e. media transport and session control signaling is carried over the IP CAN;

Scenario B: The serving access network is a CS access only. Here both, i.e. media transport and session control signaling is carried over a CS domain access;

Scenario C: Both, CS domain access and an IP-CAN are present as serving access networks, but the IP-CAN is not capable of transporting bi-directional speech media. Here, media transport is carried over CS access and session and media control signaling is carried either over the CS domain access or over the IP-CAN which is not capable of transporting bi-directional (speech) media.

In such scenarios, many aspects need to be reconsidered; one of these is the handling of terminating calls towards users, which have service control only in the IMS. These users are called ICS users in this document (illustrated in some Figures as ICS UE).

The IMS is mostly unaware of the PS capabilities of the access network. Thus, as described above in relation to scenarios A, B, and C, the access network might thus be able to transfer both, the session control signaling and the (speech) media via PS domain, or the access network might be able to support session control signaling via PS domain (described as I1-ps below), but the access network might not able to transfer media such as speech via e.g. VoIP and therefore has to use CS domain access for that. Or the access network is even not multiRAB/DTM (multiRAB=multiple Radio Access Bearer, DTM=Dual Transfer Mode) capable, i.e. does not allow PS and CS to exist/be used in parallel. In that case even I1-ps can't be used for session control signaling and session control signaling must then be handled via CS access (described as I1-cs below).

One may imagine that the user experience is quite worse if the IMS selects to use an access network not capable of handling VoIP for a speech connection. Or if the ICS UE is roaming in or to a GSM cell from a DTM/Multi-RAB capable cell, which is thus not DTM capable, and terminating session setup failed for that reason.

The above scenarios are being dealt with in release 7 of 3GPP, 3GPP Rel-7, for Voice Call Continuity VCC (TS 23.206v720) and to some extent described within the Rel-7 Study on Optimizations and Enhancements for Real-time IMS communication (TR 23.818v0.10.0). For example chapter 11 of TR 23.818 analyses domain selection, also for terminated call routing. For domain selection, it can be distinguished between service domain selection SDS on one hand and access domain selection ADS on the other hand.

A call terminating at a terminal UE and routed to the terminal has thus to be analyzed in terms of terminating service domain selection TSDS and whether to use CS termination services or IMS termination services. Also, a call has to be analyzed in terms of terminating access domain selection TADS and whether to use IMS access or CS access.

The function TADS-IMS above selects either IMS access, which includes PS access, or CS access for allocating the bearer channel. For the access domain selection decision, the TADS-IMS takes the following factors into account:

The state of the UE in the circuit switched domain, i.e. whether detached or attached. The state of the UE in the IMS, i.e. whether registered or deregistered. The domain used by an existing session (i.e. whether PS or CS domain). The media components included in the incoming IMS multimedia telephony. User preferences and/or operator policy.

A network operator may configure his operator policies to give preferences to one or the other access domain, but at least in roaming scenarios these preferences may not be suitable and problems may occur as described hereinabove. The access domain selection in the IMS thus selects the access domain "blindly".

But for ICS (IMS centralized services) the situation is even more difficult, because between the UE and the IMS two channels may be active, one to control the session and another one to transfer the media. VCC Rel-7 and the Study on Optimization and Enhancements for Real-time IMS communication propose a function TADS-IMS which selects the same access network for the session control channel and the media channel.

In above outlined scenarios for terminating calls terminating at roaming terminals various problems may arise which degrade the service experience for a user.

SUMMARY OF THE INVENTION

It is hence an object of the present invention to provide for corresponding improvement in the hitherto known scenarios.

Accordingly, at least according to individual aspects of the present invention, such object is solved by:

(A)
A method, comprising:
acquiring information about the capabilities of an access network in which a terminal is camping,
receiving an invitation to participate in an incoming call, the incoming call having a media channel and a session control channel,
analyzing the acquired information about the capabilities of the access network,
responding to the invitation, based on the result of the analyzing, with an indication that indicates a respective access domain to be used for at least one of the media channel and the session control channel of the incoming call, thereby providing for assisted access domain selection for incoming calls.

A method as mentioned above, wherein the acquiring comprises at least one of deriving capability information based on received broadcast information, deriving capability information based on an access technology used by the access network, deriving capability information based on a previous access domain selected.

A method as mentioned above, wherein the acquiring comprises deriving IMS network capability information based on received indication from IMS to determine whether it is ICS capable or not.

A method as mentioned above, wherein the capabilities of the access network comprise at least one of the following information:
the access network is dual transfer mode, DTM, capable,
the access network is a public land mobile network PLMN,
the access network uses one of universal mobile telecommunication standards UMTS, high speed packet access HSPA, wireless local area network WLAN, global standard of mobile communication GSM.

A method as mentioned above, wherein the indication specifies whether the session control channel access domain differs from the media channel access domain.

A method as mentioned above, comprising establishing, by the terminal, the media channel and the session control channel of the call in a respective access domain based on the indication.

(B)
An apparatus, comprising:
an acquisitioner configured to acquire information about the capabilities of an access network in which the device is camping,
a receiver configured to receive an invitation to participate in an incoming call having a media channel and a session control channel,
an analyzer configured to analyze the acquired information about the capabilities of the access network,
a responder configured to respond to the invitation, based on the result of the analysis, with an indication that indicates a respective access domain to be used for at least one of the media channel and the session control channel of the incoming call.

An apparatus as mentioned above, wherein the acquisitioner is configured to derive at least one of
capability information based on received broadcast information,
capability information based on an access technology used by the access network,
capability information based on a previous access domain selected.

An apparatus as mentioned above, wherein the acquisitioner is configured to derive IMS network capability information based on received indication from IMS to determine whether it is ICS capable or not.

An apparatus as mentioned above, wherein the indication specifies whether the session control channel access domain differs from the media channel access domain.

An apparatus as mentioned above, comprising an establisher configured to establish the media channel and the session control channel of the call in a respective access domain based on the indication.

(C)
An apparatus, comprising
a receiver configured to receive an indication that indicates a respective access domain to be used for at least one of a media channel and a session control channel of a call,
an establisher configured to establish the media channel and the session control channel of the call in a respective access domain based on the indication.

(D)
A system, comprising: an apparatus according to any of the above under item (B), and an apparatus according to item (C).

(E)
A module, comprising:
an acquisitioner configured to acquire information about the capabilities of an access network in which a device is camping,
a receiver configured to receive an invitation to participate in an incoming call having a media channel and a session control channel,
an analyzer configured to analyze the acquired information about the capabilities of the access network,
a responder configured to respond to the invitation, based on the result of the analysis, with an indication that indicates a respective access domain to be used for at least one of the media channel and the session control channel of the incoming call.

(F)
A method, comprising:
receiving an indication that indicates a respective access domain to be used for at least one of a media channel and a session control channel of a call,
establishing the media channel and the session control channel of the call in a respective access domain based on the indication.

(G)
A computer program product, comprising executable software code portions which when executed on a processor:
acquire information about the capabilities of an access network in which a device is camping,
receive an invitation to participate in an incoming call having a media channel and a session control channel,
analyze the acquired information about the capabilities of the access network,
respond to the invitation, based on the result of the analysis, with an indication that indicates a respective access domain to be used for at least one of the media channel and the session control channel of the incoming call.

According to exemplary embodiments of the present invention, this object is for example achieved by the following exemplary aspects of a method, terminal, system, and/or module exemplarily embodying a respective aspect of the invention, as outlined herein below, together with respective individual further refinements of the above exemplary aspects:

Aspect 1:
A method comprising:
providing for assisted access domain selection for incoming calls having a media channel and a session control channel,
acquiring, at a terminal, information about the capabilities of an access network in which the terminal is camping,
receiving, at the terminal, an invitation to participate in a call,
analyzing, at the terminal, the acquired information about the capabilities of the access network, responding to the invitation, based on the result of the analyzing, with an indication that indicates a respective access domain to be used for at least one of the media channel and the session control channel of the incoming call.

Aspect 2:
A method according to aspect 1, wherein the acquiring comprises at least one of
deriving capability information based on received broadcast information,
deriving capability information based on an access technology used by the access network,
deriving capability information based on a previous access domain selected.

Aspect 2a:
A method according to aspect 1, wherein the acquiring comprises
deriving IMS network capability information based on received indication from IMS to determine whether it is ICS capable or not.

Aspect 3:
A method according to aspect 1, wherein the capabilities of the access network comprise at least one of the following information:
the access network is dual transfer mode, DTM, capable,
the access network is a public land mobile network PLMN,
the access network uses one of universal mobile telecommunication standards UMTS, high speed packet access HSPA, wireless local area network WLAN, global standard of mobile communication GSM.

Aspect 4:
A method according to aspect 1, wherein the indication specifies whether the session control channel access domain differs from the media channel access domain.

Aspect 5:
A method according to aspect 1, comprising establishing, by a network entity, the media channel and the session control channel of the call in a respective access domain based on the indication.

Aspect 6:
A method according to aspect 1, comprising establishing, by the terminal, the media channel and the session control channel of the call in a respective access domain based on the indication.

Aspect 7:
A terminal, comprising:
an acquisition unit configured to acquire information about the capabilities of an access network in which the terminal is camping,
a receiver unit configured to receive an invitation to participate in an incoming call having a media channel and a session control channel,
an analyzing unit configured to analyze the acquired information about the capabilities of the access network,
a responder unit configured to respond to the invitation, based on the result of the analyzing, with an indication that indicates a respective access domain to be used for at least one of the media channel and the session control channel of the incoming call.

Aspect 8:
A terminal according to aspect 7, wherein the acquisition unit is configured to derive at least one of capability information based on received broadcast information, capability information based on an access technology used by the access network, capability information based on a previous access domain selected.

Aspect 8a:

A terminal according to aspect 7, wherein the acquisition unit is configured to derive IMS network capability information based on received indication from IMS to determine whether it is ICS capable or not.

Aspect 9:

A terminal according to aspect 7, wherein the indication specifies whether the session control channel access domain differs from the media channel access domain.

Aspect 10:

A terminal according to aspect 7, comprising an establishing unit configured to establish the media channel and the session control channel of the call in a respective access domain based on the indication.

Aspect 11:

A network entity comprising a receiving unit configured to receive, from a terminal, an indication that indicates a respective access domain to be used for at least one of a media channel and a session control channel of a call, an establishing unit configured to establish the media channel and the session control channel of the call in a respective access domain based on the indication.

Aspect 12:

A system comprising a terminal according to any of the above aspects 7 to 10 and a network entity according to aspect 11.

Aspect 13:

A module, for use with a terminal, comprising:

an acquisition unit configured to acquire information about the capabilities of an access network in which the terminal is camping, a receiver unit configured to receive an invitation to participate in an incoming call having a media channel and a session control channel, an analyzing unit configured to analyze the acquired information about the capabilities of the access network, a responder unit configured to respond to the invitation, based on the result of the analyzing, with an indication that indicates a respective access domain to be used for at least one of the media channel and the session control channel of the incoming call.

Thus, with the present invention being realized, at least some of the following advantages can be achieved, whether individually or in aggregation for a respective particular exemplary embodiment:

Aspects of the invention improve call termination when using PS access for session control signaling in IMS centralized services ICS. The access network capabilities, which may vary on a cell or call basis (or on a cell and call basis), are according to aspects of the invention now taken into account (e.g., when cell reselection from 3G to 2G occurred, the IMS network is not aware about this) so that the terminal is now aware thereof and may inform the network, i.e. ICS about this. In contrast to a previous approach, in which the IMS is not always aware of the PS capabilities of the access network, the terminal now acquires this information and assists the IMS to establish the call. The access domain selection in the UE thus supports the access domain selection in the IMS. Access domain selection in the UE thus selects the access domain no longer "blindly" because it knows the PS capability of the access network and thus support by the UE can be given to the IMS. Also, according to aspects of the invention, access domain selection for a separate session control channel is enabled. Thus, if the ICS UE is roaming in or to a GSM cell from a DTM/Multi-RAB capable cell, which is thus not DTM capable, a terminating session setup will no longer fail because the IMS is now aware of the changed cell capabilities due an the invention being applied in such scenario.

BRIEF DESCRIPTION OF THE DRAWINGS

The invention will be readily understood when read in conjunction with the accompanying drawings, which shows in FIG. 1 session control and bearer control signaling paths extending from IMS domain through an access network.

DESCRIPTION OF EXEMPLARY EMBODIMENTS

According to exemplary aspects of the invention, the invention introduces the Terminated Access Domain Selection function into the UE (TADS-UE) for IMS Centralized Services ICS. This function supports the TADS-IMS function in the network to select the terminated access domain for both, the session control channel and the bearer channel carrying the media (media transport channel).

The TADS-UE has more information about the PS capabilities of the access network than the TADS-IMS in the network. The information is derived from broadcast information (e.g. DTM (Dual Transfer Mode), PLMN (Public Land Mobile Network)), from the used radio access technology (e.g. UMTS or HSPA (High Speed Packet Access), WLAN (Wireless Local Area Network)) or derived from experiences (e.g. pure previous VoIP connection) and thus from historical access domain "data".

According to a particular aspect, the terminal is configured to analyze the capabilities of the access network in which it is camping. Optionally or additionally, the terminal may also be configured to analyze the IMS network capabilities, and to take those (also) in account for the selection of the PS or CS domain for session control channel/media channel establishment. Moreover, under another exemplary aspect of the invention, the terminal is configured to derive IMS network capability information based on e.g. a received indication from the IMS network to determine whether the terminal is ICS (IMS Centralized Services) capable or not.

According to a particular aspect, the terminal responds with an indication to use e.g. CS domain for media channel establishment. However, in case the terminal "discovers" as a result of access network capabilities analysis that the access network is PS capable, session setup may just continue if the IP-CAN is capable to handle both media channel and the session control channel of the incoming session.

Figure 2:
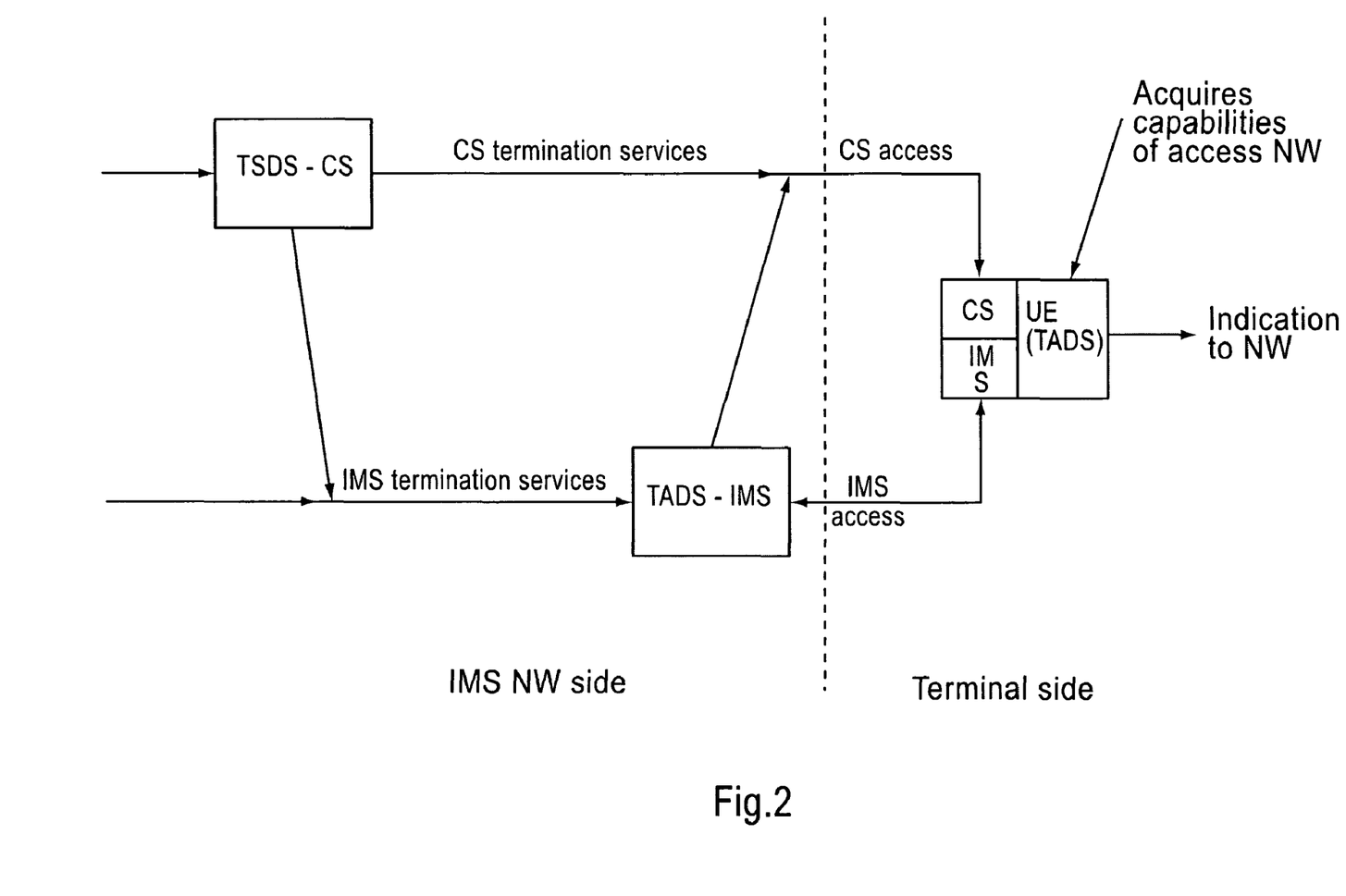
FIG. 2 terminated access domain selection (TADS) implemented in the terminal according to an aspect of the invention, FIGS. 3a and 3b scenarios in which the ICCF initiates a CS terminated ICS call, FIGS. 4a and 4b (except case 3) scenarios in which a ICS UE performs CS origination call for a terminating session, and FIG. 5 a scenario in which I1-PS is not available for the session control channel, and FIG. 6 a block circuit diagram of a system constituted by at least one network element according to an aspect of the invention and at least one terminal according to an aspect of the invention.

FIG. 2 shows functionalities associated to the IMS network side as well as to the terminal side.

On the IMS network side is arranged the TSDS-CS function for Terminated Service Domain Selection TSDS for CS domain and Terminated Access Domain Selection for IMS, i.e. PS domain, as outlined in the above referenced report TR23.818. Accordingly, the TADS-IMS function controls access domain selection and selects the same domain, i.e. PS or CS, for both, the media channel as well as the session control channel.

On the terminal side is arranged the CS access module and the PS or IMS access module, respectively. Further, the terminal UE is provided with a module TADS for terminated Access Domain selection. This module is configured to enable selection of different access domains for the session control channels and media channels for an incoming, i.e. terminating call. This is supported according to aspects of the invention by acquiring information about the capabilities of the access network in which the roaming terminal camps and by indicating the selected or to be selected domains to the network side, as illustrated in FIG. 2 by an arrow from the UE towards the TADS-IMS function unit.

Figure 3A:
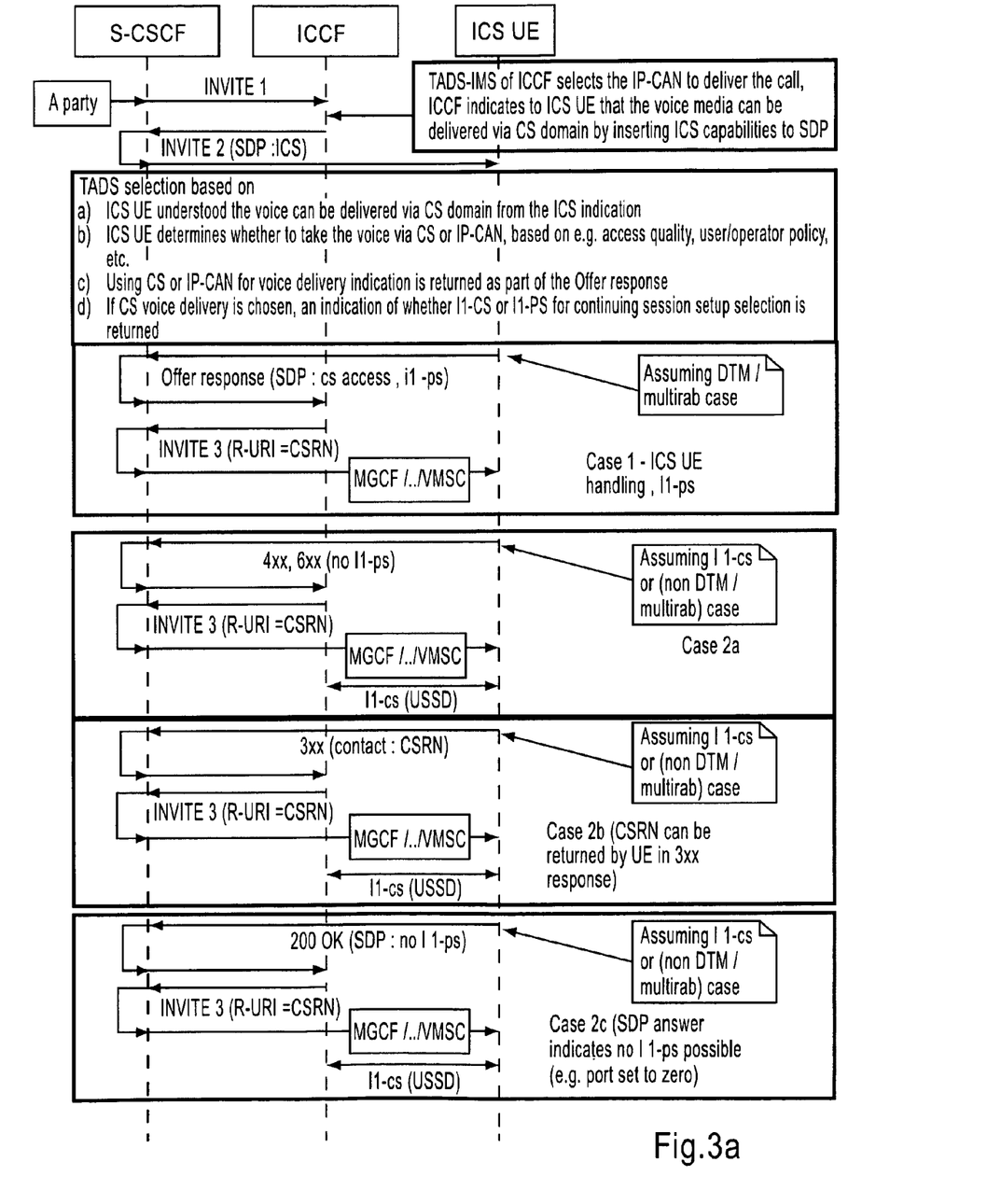
Figure 3B:
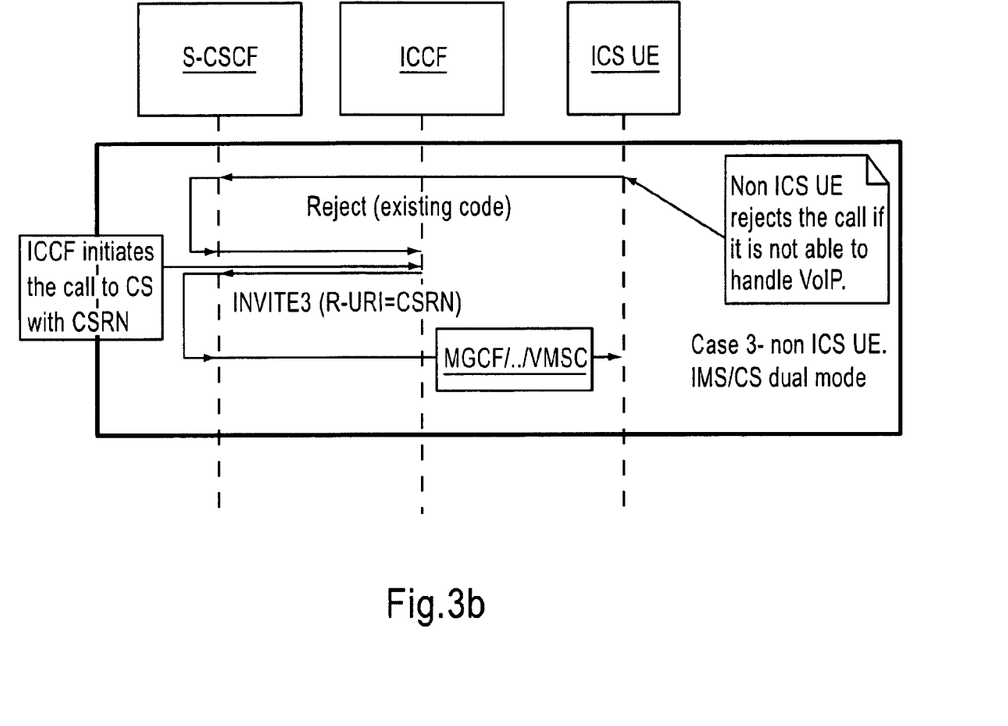

FIGS. 3a and 3b illustrate scenarios in which the ICCF initiates a CS terminated ICS call.

In FIG. 3 and the following ones, entities are shown in horizontal arrangement and the signaling exchanged between them as time lapses is illustrated in the vertical direction. A calling party is denoted as A party. A called party, normally denoted as B party, is represented by the ICS UE (IMS Centralized Service enabled user equipment). A S-CSCF denotes a serving call state control functionality in the network which provides (core) network access to the calling party. An ICCF denotes the IMS Centralized Services Control Function (comprising at least the TADS-IMS shown in FIG. 2). Individual message names are examples taken from SIP messages (Session Initiation Protocol), as a widely used protocol in IMS scenarios without any intention or necessity to limit the invention to SIP based scenarios. Other signaling protocols different from SIP may likewise be applied without departing from the concept underlying exemplary embodiments of the invention as described herein.

The IMS Centralized Service ICS considers allowing session control signaling via PS (I1-ps) or via CS (I1-cs) domain. Session control signaling via I1-ps allows, because of the bandwidth and the signaling capabilities, more enriched session control than I1-cs. Therefore it is beneficial to use I1-ps whenever possible.

For descriptive purposes, the description of exemplary aspects of the invention starts from that point, i.e. TADS-IMS function in the IMS network side (located at/in ICCF) selects I1-ps to send an INVITE to the ICS UE. That is, the TADS-IMS selects the IP-CAN to deliver the call, the ICCF indicates to the ICS_UE that voice media can be delivered via CS domain by inserting ICS capabilities to the SDP (Session Description Protocol). The TADS (not shown in FIGS. 3a,b) in the ICS_UE then responds to this offer, i.e. accepts the call or replies with (from its perspective) a different access network selection for the session control path and/or the media channel. Prior to the response, the ICS_US, i.e. its TADS-UE functionality or module performs a selection, which involves: based on the ICS UE understood that the voice can be delivered via CS domain from the ICS indication, the ICS UE determines whether to take the voice via CS or IP-CAN, based on e.g. access quality, user/operator policy, etc., using CS or IP-CAN for voice delivery indication is returned as part of the Offer response, and if CS voice delivery is chosen, an indication of whether I1-CS or I1-PS for continuing session setup selection is returned.

In more detail, stated in other words, in FIG. 3a the S-CSCF forwards to the ICCF an INVITE message (Invite 1) from the calling party A. The ICCF is aware that the ICS UE is reachable via packet switched services due to its registration in the system/network. The ICCF thus offers ICS services to the called party (ICS UE). This is accomplished by inserting ICS capability information to the Session description protocol message SDP forwarded from the ICCF to the ICS_UE in a subsequent INVITE message (Invite 2), thereby indicating to the ICS UE that ICS service is available via packet switched domain, i.e. I1-ps.

Insofar, the terminal has received an invitation to participate in a call.

Also, the terminal acquires information about the capabilities of an access network in which the terminal is camping. The acquisition can for example be "permanently" when listening to broadcast information, regularly when configured on a timer basis, or triggered by an event such as entering a new cell, etc. The capabilities of the access network may vary on a per cell and/or on a per call basis.

The terminal analyzes the acquired information about the capabilities of the access network, and responds to the invitation, based on the result of the analyzing, with an indication that indicates a respective access domain to be used for at least one of the media channel and the session control channel of the incoming call.

For FIG. 3 it is assumed that the ICS UE is based on the acquisition process aware of limited PS access capabilities of the access network it currently camps in and that voice or media may be delivered via the CS domain. It then analyzes and determines whether to take the call via CS or IP-CAN based on the acquired information, e.g. access quality, user and/or operator policy. Then the terminal sends a response with an indication to select CS or IP-CAN, and/or indicating whether the access network, i.e. the current cell thereof, is DTM/multiRAB enabled or not.

For example, the indication indicates CS access for media and I1-cs or I1-ps for session control signaling. A non ICS UE (also aware of the access network capabilities or not VoIP capable) would send an error code back to the ICCF indication that VoIP is not possible. The ICCF could then initiate the call towards the CS domain.

FIGS. 3a and 3b distinguish between individual cases.

In case 1 (assuming a multiRAB/DTM access available), the terminal sends back to the ICCF an offer response as an answer in SIP indicating in the SDP part CS access for media and I1-PS for session control. The ICCF then sends another INVITE message (invite 3) indicating the request uniform resource identifier (R-URI) to be CSRN (Circuit Switched domain Routing Number) on the basis of which the media/speech is delivered via CS domain (represented by a MGCF/VMSC in the figure (MGCF=Media Gateway Control Function, VMSC=Visited Mobile Services Switching Center).

In cases 2a, 2b, and 2c it is assumed that only a non DTM/multiRAB enabled access network is currently available.

In case 2a, the ICS UE sends back a SIP error message of type 4xx (client error) or 6xx (global failure) indicating that no PS access domain is available. The subsequent INVITE message (Invite 3) is as in case 1. Then media is delivered via CS domain as in case 1, while also the session control signaling is delivered via CS domain, as illustrated by I1-cs using e.g. USSD (Unstructured Supplementary Service Data).

Cases 2b and 2c differ from case 2a only in the message used for the indication from the ICS UE to the ICCF. In case 2b it is a SIP Redirection message of type 3xx indicating that CSRN is to be contacted. In case 2c it is a SIP Success message of type 2xx, e.g. 200OK indicating in the SDP part that no PS access domain is available.

In case 3 shown in FIG. 3b the ICS UE is a non-enabled ICS UE and it rejects the invited call if it is not able to handle media via packet switched domain, e.g. VoIP. The reject message uses an existing code, for example. The remaining signaling is as in cases 1, 2a, b, c.

Figure 4A:
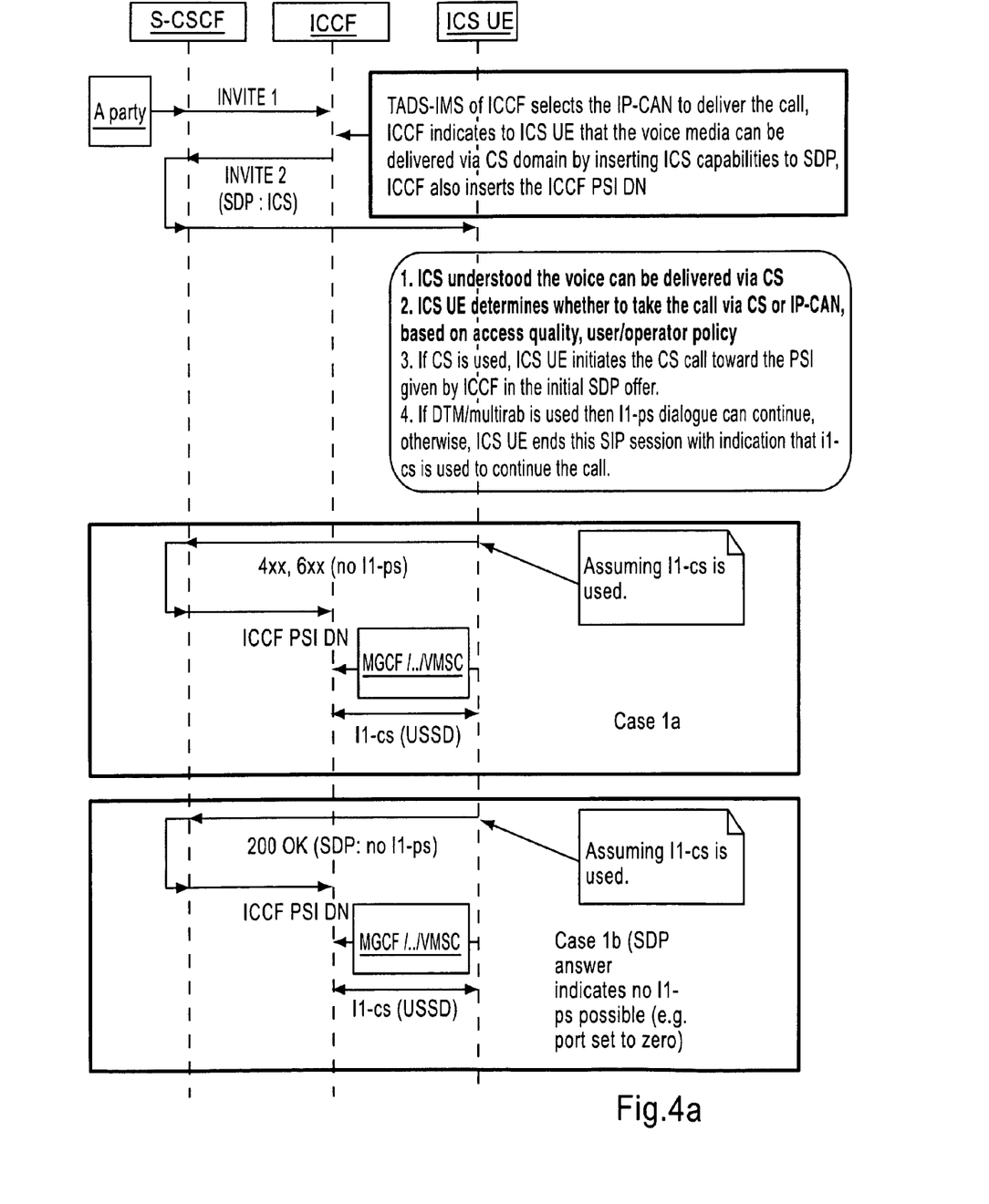
Figure 4B:
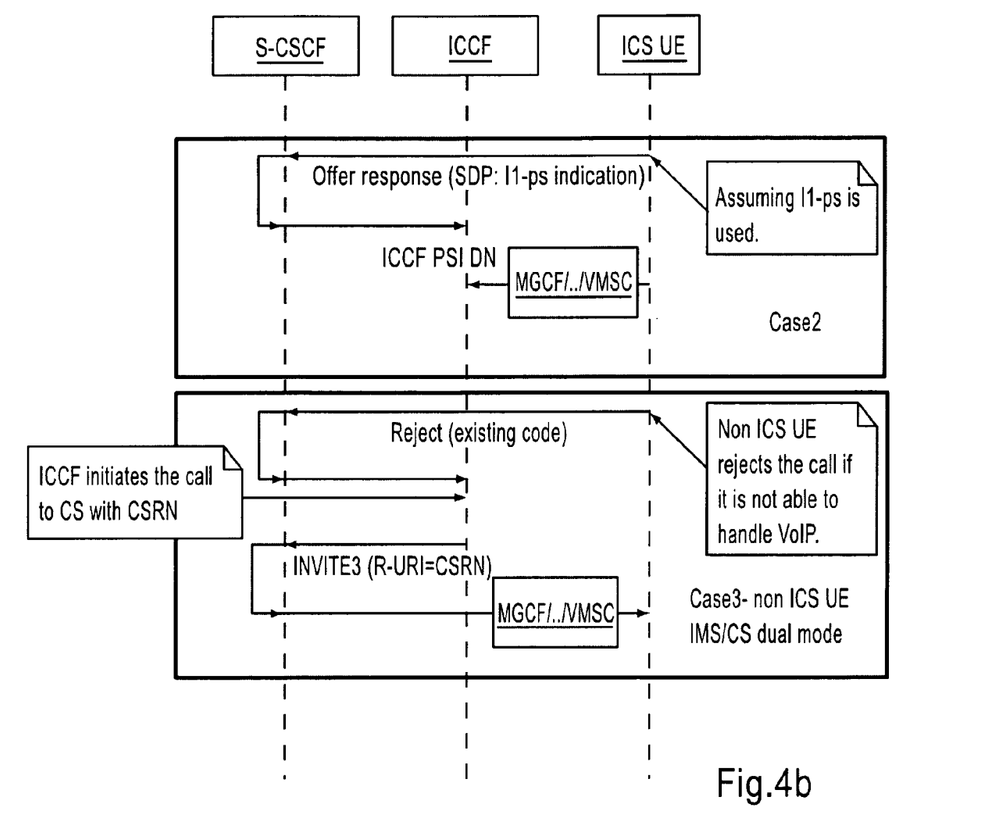

In FIGS. 4a and 4b below the ICCF also sends an INVITE indicating ICS via I1-ps to the ICS_UE, but here in this exemplary embodiment of the invention, the terminal ICS_UE follows a different call establishment strategy.

Instead of sending an indication back to the ICCF for the ICCF to establish the CS bearer, the ICS UE itself establishes the CS bearer by performing a CS origination call (here again it is assumed that media via PS domain e.g. VoIP is not possible). The indication sent back to the ICCF just indicates to use I1-ps or I1-cs for session control signaling.

In detail, the ICCF also inserts in the INVITE message (Invite 2) the ICCF's PSI DN (PSI=Public Service Identity, DN=Domain Name). More precisely, this means that the TADS-IMS selects the IP-CAN to deliver the call, the ICCF indicates to the ICS_UE that voice media can be delivered via CS domain by inserting ICS capabilities to the SDP (Session Description Protocol), and the ICCF also inserts the ICCF PSI DN. The ICS UE, if CS is used, initiates the CS call towards the PSI given by the ICCF in the initial SDP offer. While, if DTM/multiRAB is used the I1-PS dialogue continues and otherwise the ICS UE ends the SIP session indicating the I1-CS is used to continue the call.

A non ICS UE would react as described above in FIG. 3b, case 3 and this is shown in FIG. 4b in case 3.

In cases 1a and 1b in FIG. 4a, the indication sent back from the ICS UE to the ICCF is as in cases 2a and 2c in FIG. 3a; However, in FIG. 4a, the ICS UE initiates the call in CS domain for the media (voice) via a MGCF/VMSC towards the ICCF's PSI DN and session control is carried via I1-CS using e.g. USSD.

Case 2 in FIG. 4b is similar to case 1 in FIG. 3a insofar as the indication sent from the ICS UE to the ICCF is concerned. However, in FIG. 4b, case 2, the ICS UE initiates the call in CS domain for the media (voice) via a MGCF/VMSC towards the ICCF's PSI DN and session control is carried via I1-PS (not shown separately).

Figure 5:
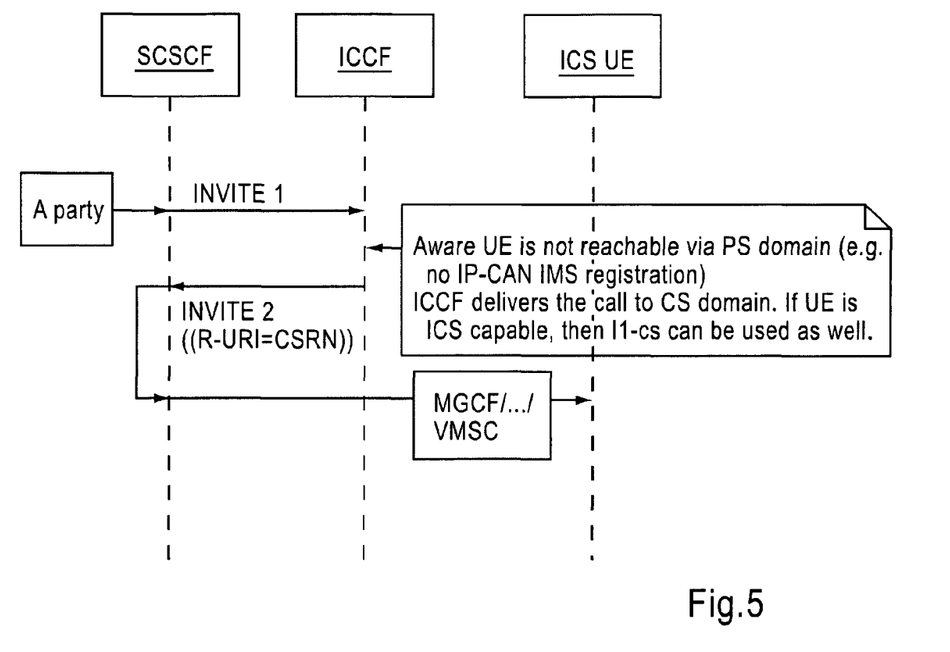

In FIG. 5 is shown the case when the TADS-IMS is aware that the UE is not IMS registered. That is, the ICCF is aware that the UE (ICS_UE) is not reachable via the PS domain (e.g. because no IP-CAN IMS registration is present); the ICCF delivers the call in such situation to the CS domain; if the UE is ICS capable, then I1-CS can be used as well; the call is thus routed to CS without involving TADS-UE of the ICS_US.

The underlying problem solved by exemplary embodiments of the invention resides in that the network is not in the best position to decide if a call is routed over CS or IMS. Therefore, under some aspect(s) of the invention, a feature is introduced to the extent that this decision is done by the UE instead.

Thus, exemplary embodiments of the invention pursue an idea to have policies in a UE to select different types of access networks depending on access network capabilities, optionally supplemented by user preferences, optionally supplemented by service requirements.

Under modifications of above described exemplary embodiments of the invention, the following features are introduced:

One possible further improvement to address for example network operator concerns relating to transferring the decision on which access domain to be selected to the UE is the following:

The ICS UE only sends proposals to the network, but the network keeps the final decision on which radio access domain to use. This involves that the UE does not immediately terminate the IMS call with a SIP failure response, but instead sends some other SIP message, e.g. a new specific SIP provisional response or a 181 session progress provisional response with some new SIP header or some new SDP extension, to indicate that a CS bearer setup is requested.

For option 1 (ICCF establishes CS access domain to UE) it is in another advantageous exemplary embodiment beneficial that a smooth transition from PS transport to CS transport is accomplished, i.e. using the PS bearer until the CS bearer is set up to enhance user experience.

Something similar is being done for 3PCC ($3^{rd}$ party call control). This implies that the UE does not immediately terminate the IMS call with a SIP failure response, but instead sends some other SIP message, e.g. a new specific SIP provisional response or a 181 session progress provisional response with some new SIP header or some new SDP extension, to indicate that a CS bearer setup is requested. The network or UE could thereafter terminate the IMS media and/or SIP dialogue once the CS bearer setup is completed.

Some similar modifications are also possible for option 2, i.e. if the ICS UE itself sets up the CS bearer: In a modification, the ICS UE sets up the CS bearer and or channel but does not terminate the PS bearer/channel until the set-up is completed. The ICCF might indicate the ongoing setup of the CS bearer by 181 session progress provisional response with some new SIP header or some new SDP extension (to the calling party (A party). The network or UE terminates the IMS media and/or SIP dialogue once the CS bearer setup is completed.

Options 1 and 2 can coexist in a system. In such a case, operator policy may give precedence to one of the options, or user preferences may give precedence to one of the options. In such a combined case as well as in each individual case, the analyzing and acquiring may involve others than only the access network capabilities but for example also the following: The state of the UE in the circuit switched domain, i.e. whether detached or attached. The state of the UE in the IMS, i.e. whether registered or deregistered. The domain used by an existing session (i.e. whether PS or CS domain). The media components included in the incoming IMS multimedia telephony. User preferences and/or operator policy.

Figure 6:
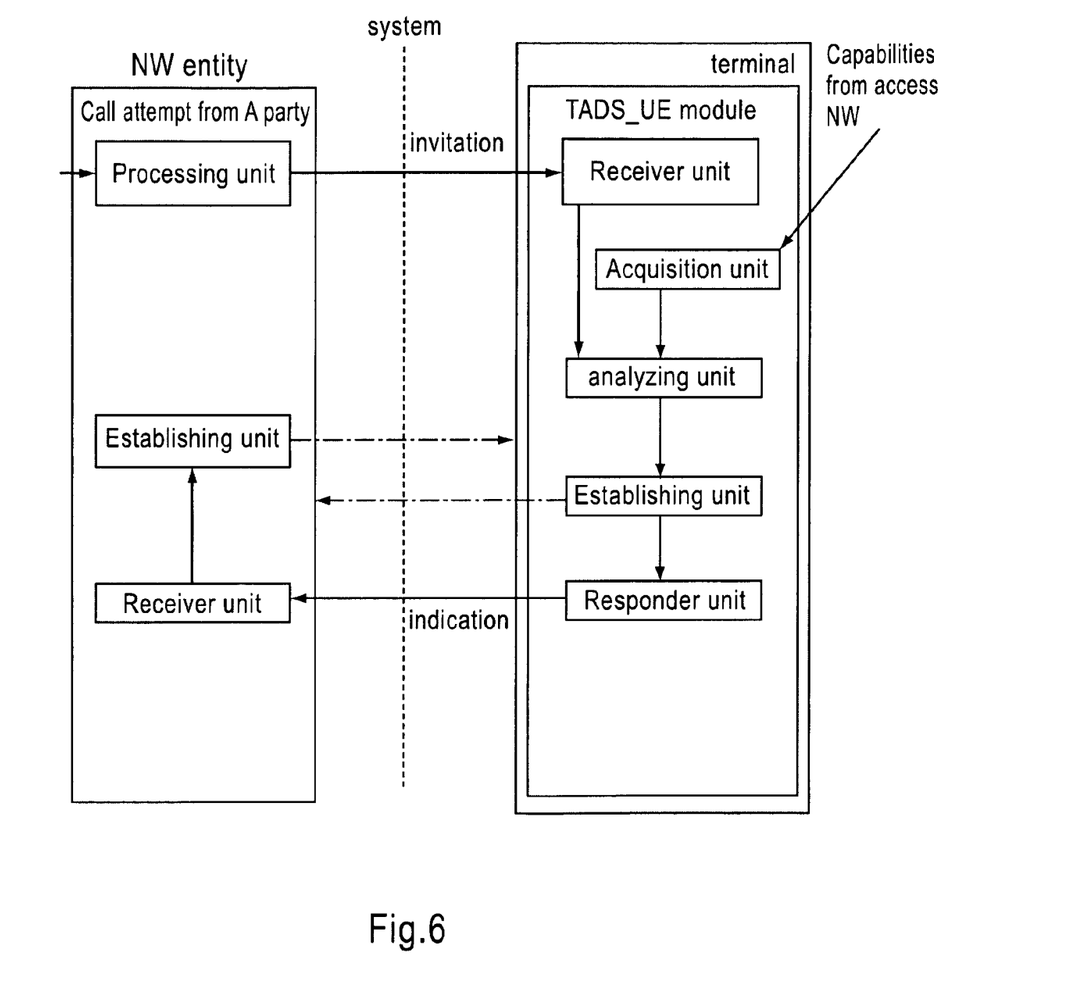

FIG. 6 shows a block circuit diagram of a system constituted by at least one network element according to an aspect of the invention and at least one terminal according to an aspect of the invention, as well as the internal constitution of the NW element and terminal insofar as the invention is concerned. Other parts such as man machine interface of a terminal and NW element are omitted to keep the illustration and description with a focus on those aspects pertaining to the invention disclosed herein.

A NW element receives a call attempt from a remote calling party A (not shown). This call attempt is processed in a processing unit and a corresponding invitation is sent to the terminal. The terminal is equipped with certain units which may form part of a module e.g. inserted or otherwise operatively coupled to the terminal. The invitation is received by a receiver unit thereof. An acquisition unit acquires capability information pertaining to the access network in which the terminal is camping, and possibly other information such as operator policies. The invitation and capability information are analyzed in an analyzing unit. Based on the analyzing result, an optionally provisioned establishing unit can optionally and/or conditionally become operative to establish a respective access domain for at least one of the media channel and the session control channel of the incoming call, as described above. Nevertheless, at least based on the result of the analyzing unit a responder unit generates an indication that indicates a respective access domain to be used for at least one of the media channel and the session control channel of the incoming call. The responder unit sends the indication to the network element.

At the NW element, the indication is received at a receiver unit and passed onwards to an establishing unit at the NW element side. The establishing unit is operative to establish a respective access domain for at least one of the media channel and the session control channel of the incoming call, as described above.

For the purpose of the present invention as described herein above, it should be noted that

- an access technology may be any technology by means of which a user equipment can access an access network (e.g. via a base station or generally an access node). Any present or future technology, such as WLAN (Wireless Local Access Network), WiMAX (Worldwide Interoperability for Microwave Access), BlueTooth, Infrared, and the like may be used; although the above technologies are mostly wireless access technologies, e.g. in different radio spectra, access technology in the sense of the present invention may also imply wirebound technologies, e.g. IP based access technologies like cable networks or fixed lines but also circuits switched access technologies; access technologies may be distinguishable in at least two categories or access domains such as packet switched and circuit switched, but the existence of more than two access domains does not impede the invention being applied thereto,
- an access network may be any device, apparatus, unit or means by which a station, entity or other user equipment may connect to and/or utilize services offered by the access network; such services include, among others, data and/or (audio-) visual communication, data download etc.;
- a user equipment may be any device, apparatus, unit or means by which a system user may experience services from an access network such as a mobile phone, personal digital assistant PDA, or computer;
- method steps likely to be implemented as software code portions and being run using a processor at a network element or terminal (as examples of devices, apparatuses and/or modules thereof, or as examples of entities including apparatuses and/or modules therefor), are software code independent and can be specified using any known or future developed programming language as long as the functionality defined by the method steps is preserved;
- generally, any method step is suitable to be implemented as software or by hardware without changing the idea of the invention in terms of the functionality implemented;
- method steps and/or devices, apparatuses, units or means likely to be implemented as hardware components at a terminal or network element, or any module(s) thereof, are hardware independent and can be implemented using any known or future developed hardware technology or any hybrids of these, such as MOS (Metal Oxide Semiconductor), CMOS (Complementary MOS), BiMOS (Bipolar MOS), BiCMOS (Bipolar CMOS), ECL (Emitter Coupled Logic), TTL (Transistor-Transistor Logic), etc., using for example ASIC (Application Specific IC (Integrated Circuit)) components, FPGA (Field-programmable Gate Arrays) components, CPLD (Complex Programmable Logic Device) components or DSP (Digital Signal Processor) components; in addition, any method steps and/or devices, units or means likely to be implemented as software components may for example be based on any security architecture capable e.g. of authentication, authorization, keying and/or traffic protection;
- devices, apparatuses, units or means can be implemented as individual devices, apparatuses, units or means, but this does not exclude that they are implemented in a distributed fashion throughout the system, as long as the functionality of the device, apparatus, unit or means is preserved,
- an apparatus may be represented by a semiconductor chip, a chipset, or a (hardware) module comprising such chip or chipset; this, however, does not exclude the possibility that a functionality of an apparatus or module, instead of being hardware implemented, be implemented as software in a (software) module such as a computer program or a computer program product comprising executable software code portions for execution/being run on a processor;
- a device may be regarded as an apparatus or as an assembly of more than one apparatus, whether functionally in cooperation with each other or functionally independently of each other but in a same device housing, for example.

Although the present invention has been described herein before with reference to particular embodiments thereof, the present invention is not limited thereto and various modification can be made thereto.

Aspects of the Invention

Thus, as has been described hereinbefore, at least some of exemplarily illustrated and described embodiments and/or aspects of the invention, refer to Aspect 1:

A method comprising:

providing for assisted access domain selection for incoming calls having a media channel and a session control channel, acquiring, at a terminal, information about the capabilities of an access network in which the terminal is camping, receiving, at the terminal, an invitation to participate in a call, analyzing, at the terminal, the acquired information about the capabilities of the access network, responding to the invitation, based on the result of the analyzing, with an indication that indicates a respective access domain to be used for at least one of the media channel and the session control channel of the incoming call.

Aspect 2:

A method according to aspect 1, wherein the acquiring comprises at least one of deriving capability information based on received broadcast information, deriving capability information based on an access technology used by the access network, deriving capability information based on a previous access domain selected.

Aspect 2a:

A method according to aspect 1, wherein the acquiring comprises deriving IMS network capability information based on received indication from IMS to determine whether it is ICS capable or not.

Aspect 3:

A method according to aspect 1, wherein the capabilities of the access network comprise at least one of the following information:

the access network is dual transfer mode, DTM, capable,
the access network is a public land mobile network PLMN,
the access network uses one of universal mobile telecommunication standards UMTS, high speed packet access HSPA, wireless local area network WLAN, global standard of mobile communication GSM.

Aspect 4:
A method according to aspect 1, wherein the indication specifies whether the session control channel access domain differs from the media channel access domain.

Aspect 5:
A method according to aspect 1, comprising establishing, by a network entity, the media channel and the session control channel of the call in a respective access domain based on the indication.

Aspect 6:
A method according to aspect 1, comprising establishing, by the terminal, the media channel and the session control channel of the call in a respective access domain based on the indication.

Aspect 7:
A terminal, comprising:
an acquisition unit configured to acquire information about the capabilities of an access network in which the terminal is camping,
a receiver unit configured to receive an invitation to participate in an incoming call having a media channel and a session control channel,
an analyzing unit configured to analyze the acquired information about the capabilities of the access network,
a responder unit configured to respond to the invitation, based on the result of the analyzing, with an indication that indicates a respective access domain to be used for at least one of the media channel and the session control channel of the incoming call.

Aspect 8:
A terminal according to aspect 7, wherein the acquisition unit is configured to derive at least one of capability information based on received broadcast information,
capability information based on an access technology used by the access network,
capability information based on a previous access domain selected.

Aspect 8a:
A terminal according to aspect 7, wherein the acquisition unit is configured to derive IMS network capability information based on received indication from IMS to determine whether it is ICS capable or not.

Aspect 9:
A terminal according to aspect 7, wherein the indication specifies whether the session control channel access domain differs from the media channel access domain.

Aspect 10:
A terminal according to aspect 7, comprising
an establishing unit configured to establish the media channel and the session control channel of the call in a respective access domain based on the indication.

Aspect 11:
A network entity comprising
a receiving unit configured to receive, from a terminal, an indication that indicates a respective access domain to be used for at least one of a media channel and a session control channel of a call,
an establishing unit configured to establish the media channel and the session control channel of the call in a respective access domain based on the indication.

Aspect 12:
A system comprising
a terminal according to any of the above aspects 7 to 10 and
a network entity according to aspect 11.

Aspect 13:
A module, for use with a terminal, comprising:
an acquisition unit configured to acquire information about the capabilities of an access network in which the terminal is camping,
a receiver unit configured to receive an invitation to participate in an incoming call having a media channel and a session control channel,
an analyzing unit configured to analyze the acquired information about the capabilities of the access network,
a responder unit configured to respond to the invitation, based on the result of the analyzing, with an indication that indicates a respective access domain to be used for at least one of the media channel and the session control channel of the incoming call.

The invention claimed is:

1. A method, comprising:
acquiring information about the capabilities of an access network in which a terminal is camping;
receiving an invitation to participate in an incoming call, the incoming call having a media channel and a session control channel;
analyzing the acquired information about the capabilities of the access network; and
responding to the invitation, based on the result of the analyzing, with an indication that indicates a respective access domain to be used for at least one of the media channel and the session control channel of the incoming call, thereby providing for assisted access domain selection for incoming calls.

2. A method according to claim 1, wherein the acquiring comprises at least one of
deriving capability information based on received broadcast information,
deriving capability information based on an access technology used by the access network, and
deriving capability information based on a previous access domain selected.

3. A method according to claim 1, wherein the acquiring comprises deriving Internet protocol multimedia system network capability information based on received indication from Internet protocol multimedia system to determine whether it is Internet protocol multimedia system centralized services capable or not.

4. A method according to claim 1, wherein the capabilities of the access network comprise at least one of the following information:
the access network is dual transfer mode capable,
the access network is a public land mobile network, and
the access network uses one of universal mobile telecommunication standards, high speed packet access, wireless local area network, global standard of mobile communication.

5. A method according to claim 1, wherein the indication specifies whether the session control channel access domain differs from the media channel access domain.

6. A method according to claim 1, comprising establishing, by the terminal, the media channel and the session control channel of the call in a respective access domain based on the indication.

7. An apparatus, comprising:
- an acquisitioner configured to acquire information about the capabilities of an access network in which the device is camping;
- a receiver configured to receive an invitation to participate in an incoming call having a media channel and a session control channel;
- an analyzer configured to analyze the acquired information about the capabilities of the access network; and
- a responder configured to respond to the invitation, based on the result of the analysis, with an indication that indicates a respective access domain to be used for at least one of the media channel and the session control channel of the incoming call.

8. An apparatus according to claim 7, wherein the acquisitioner is configured to derive at least one of
- capability information based on received broadcast information,
- capability information based on an access technology used by the access network, and
- capability information based on a previous access domain selected.

9. An apparatus according to claim 7, wherein the acquisitioner is configured to derive Internet protocol multimedia system network capability information based on received indication from Internet protocol multimedia system to determine whether it is Internet protocol multimedia system centralized services capable or not.

10. An apparatus according to claim 7, wherein the indication specifies whether the session control channel access domain differs from the media channel access domain.

11. An apparatus according to claim 7, further comprising:
- an establisher configured to establish the media channel and the session control channel of the call in a respective access domain based on the indication.

12. An apparatus, comprising:
- a receiver configured to receive an indication that indicates a respective access domain to be used for at least one of a media channel and a session control channel of a call; and
- an establisher configured to establish the media channel and the session control channel of the call in a respective access domain based on the indication.

13. A system, comprising:
- an apparatus according to claim 7; and
- an apparatus comprising a receiver configured to receive an indication that indicates a respective access domain to be used for at least one of a media channel and a session control channel of a call, and an establisher configured to establish the media channel and the session control channel of the call in a respective access domain based on the indication.

14. A module, comprising:
- an acquisitioner configured to acquire information about the capabilities of an access network in which a device is camping;
- a receiver configured to receive an invitation to participate in an incoming call having a media channel and a session control channel;
- an analyzer configured to analyze the acquired information about the capabilities of the access network; and
- a responder configured to respond to the invitation, based on the result of the analysis, with an indication that indicates a respective access domain to be used for at least one of the media channel and the session control channel of the incoming call.

15. A method, comprising:
- receiving an indication that indicates a respective access domain to be used for at least one of a media channel and a session control channel of a call; and,
- establishing the media channel and the session control channel of the call in a respective access domain based on the indication.

16. A computer program product embodied on a non-transitory computer readable storage medium, the computer program product comprising executable software code portions which when executed on a processor:
- acquire information about the capabilities of an access network in which a device is camping;
- receive an invitation to participate in an incoming call having a media channel and a session control channel;
- analyze the acquired information about the capabilities of the access network; and
- respond to the invitation, based on the result of the analysis, with an indication that indicates a respective access domain to be used for at least one of the media channel and the session control channel of the incoming call.

* * * * *